Oct. 13, 1959 R. L. SMIRL 2,908,181
TRANSMISSION FOR AUTOMOTIVE VEHICLES
Original Filed Nov. 8, 1949 4 Sheets-Sheet 1

Inventor:
Richard L. Smirl
By

Oct. 13, 1959    R. L. SMIRL    2,908,181
TRANSMISSION FOR AUTOMOTIVE VEHICLES
Original Filed Nov. 8, 1949    4 Sheets-Sheet 2

Fig. 12
HILL BRAKE.

Fig. 13
REVERSE.

Inventor:
Richard L. Smirl
By Edward C. Fritzpaugh
Atty.

Oct. 13, 1959

R. L. SMIRL

2,908,181

TRANSMISSION FOR AUTOMOTIVE VEHICLES

Original Filed Nov. 8, 1949

Inventor:
Richard L. Smirl
By:

United States Patent Office 2,908,181
Patented Oct. 13, 1959

2,908,181

TRANSMISSION FOR AUTOMOTIVE VEHICLES

Richard L. Smirl, La Grange Park, Ill., assignor to Borg-Warner Corporation, Chicago, Ill., a corporation of Illinois Continuation of application Serial No. 126,113, November 8, 1949. This application November 3, 1955, Serial No. 544,767

25 Claims. (Cl. 74—472)

My invention relates to transmissions and more particularly to transmissions for automotive vehicles.

This application is a continuation of my copending application for "Transmission," Serial No. 126,113, filed November 8, 1949, now abandoned.

It is an object of my invention to provide an improved transmission control system which includes two hydraulically actuated valves, one for upshifting the transmission from a low speed ratio to an intermediate speed ratio and the other for upshifting the transmission from the intermediate speed ratio to a high speed ratio, each of the valves being influenced to make an upshifting movement by a fluid pressure from a fluid pump which is driven by the driven shaft of the transmission and which is connected with an orifice constantly relieving the fluid pressure from the pump whereby the pressure varies in accordance with the driven shaft speed and the valves being influenced to move in the opposite direction by a fluid pressure that varies in accordance with the output torque of the vehicle engine.

It is a further object in connection with such controlling mechanism to provide means for selectively relieving the fluid pressure from the driven shaft pump on the intermediate to high speed shift valve so that the transmission may be selectively downshifted from high speed ratio to intermediate speed ratio. It is another object to provide an orifice which is selectively opened and closed for relieving the pressure on this valve and to provide in connection with this orifice a thermostatically controlled valve responsive to the temperature of the fluid impressed on the valve for assuring a downshifting movement of the valve at the same fluid pressure regardless of changes in temperature of the fluid.

It is another object to provide a fluid pressure that increases with the speed of the drive shaft of the transmission provided by an orifice connected with a drive shaft pump and means responsive to the pressure of the driven shaft pump that varies in accordance with the speed of the driven shaft of the transmission for closing this orifice above a certain speed of the driven shaft after an initial engagement of the starting friction engaging means of the transmission has been obtained under the influence of the fluid pressure that varies with the speed of the drive shaft.

It is a further object in connection with this orifice connected with the drive shaft pump to partially close the orifice for providing a higher fluid pressure for completing a reverse drive through the transmission by engaging a friction engaging means with this fluid pressure. It is contemplated that the same friction engaging means may be used for completing the reverse drive as is used for completing a high speed forward direct drive through the transmission and that the complete torque of the engine is taken in reverse drive by the friction engaging means but only a portion of it is taken by the friction engaging means for the forward drive and hence the desirability of the higher fluid pressure for reverse.

It is an object of the invention to regulate the fluid pressure discharged by the drive shaft pump of the transmission, after attainment of full engagement of the starting friction engaging means of the transmission, in accordance with the output torque of the vehicle engine and in this connection to provide a regulating valve which is controlled by a vacuum motor connected with the intake manifold of the vehicle engine. In this connection, it is an object to provide a one-way connection between the vacuum motor and the valve, so that when the vacuum in the manifold increases above a predetermined value or the absolute pressure in the manifold decreases below a corresponding value, the vacuum motor is thereafter not effective on the value, so that at least a predetermined minimum pressure is maintained by the regulating valve.

In connection with the downshifting arrangement above referred to, it is an object to provide a relief valve for the fluid pressure discharged by the driven shaft pump which is effective after both the upshift valves have been shifted into their upshifted positions for relieving the fluid pressure and to so construct this valve that it is responsive also to the fluid pressure discharged by the drive shaft pump for causing the maximum fluid pressure produced by the driven shaft pump to be less for a decreased fluid pressure from the drive shaft pump whereby an upshifting movement of the intermediate to high ratio valve is not caused when it is desired to drive the vehicle in intermediate speed drive with the accelerator in released or nearly released position.

The invention consists of the novel constructions, arrangements and devices to be hereinafter described and claimed for carrying out the above-stated objects and such other objects as will appear from the following description of preferred embodiments of the invention, illustrated with reference to the accompanying drawings, wherein:

Like characters of reference in the following description designate like parts in the several views of the drawings.

The transmission shown and described herein, exclusive of its controls, is substantially shown and described also in my copending application, Serial No. 84,581, filed March 31, 1949, now Patent No. 2,700,312, issued January 25, 1955, and is also shown and described, together with a system of controls, of which the controls shown in the present application constitute an improvement, in my copending application, Serial No. 94,580, filed May 21, 1949, now Patent No. 2,794,349.

Figure 1:
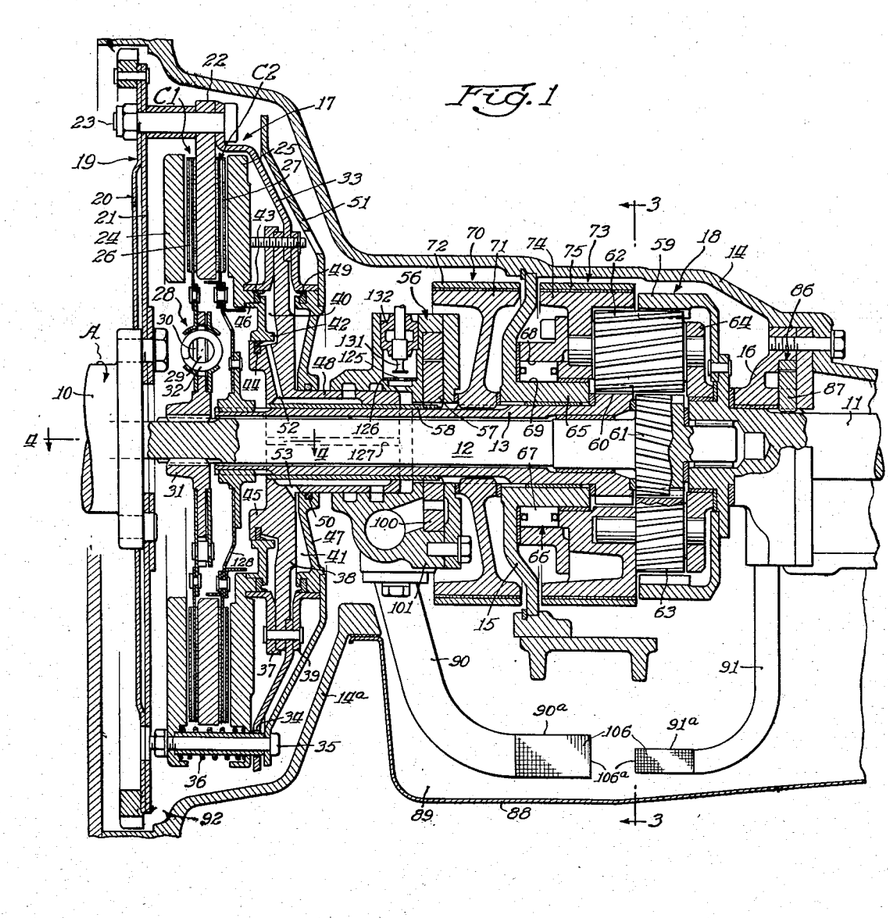
Fig. 1 is a longitudinal sectional view of a transmission, including a hydraulically actuated clutch assembly, with which my improved transmission controls may be used.

Referring now to Fig. 1, the transmission may be seen to comprise a drive shaft 10, a driven shaft 11, an intermediate shaft 12, and a sleeve shaft 13. The shaft 10 is adapted to be connected to the engine of the vehicle in which the transmission is installed, and the shaft 11 is adapted to be connected to the driving road wheels of the vehicle by means of any suitable connecting mechanism (not shown). The shaft 12 is piloted in the shafts 10 and 11, and the shaft 13 is rotatably disposed on the shaft 12. The shafts 11, 12 and 13 are journalled within the transmission housing 14 by means of housing portions 15 and 16, as shown.

The transmission comprises a hydraulically actuated clutch assembly 17 adapted to be driven by the drive shaft 10 and a planetary gear set 18 connected to be driven by the clutch assembly and to drive the driven shaft 11.

Figure 2:
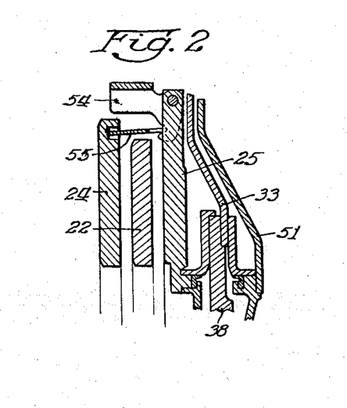
Fig. 2 is a fragmentary sectional view of the clutch assembly similar to the view in Fig. 1 but taken in a different plane.
Figure 3:
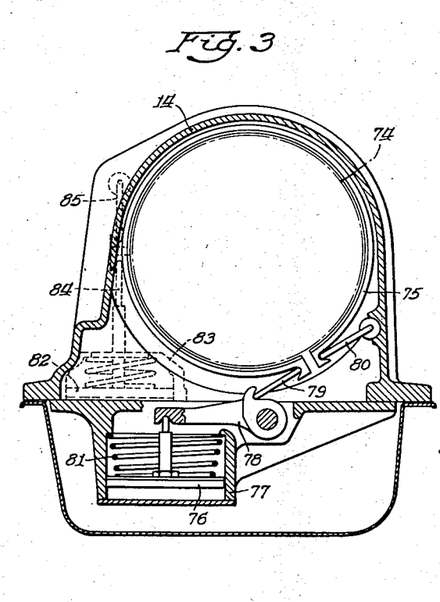
Fig. 3 is a sectional view taken on line 3—3 of Fig. 1.
Figure 4:
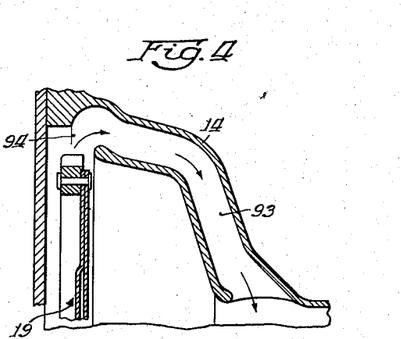
Fig. 4 is a sectional view taken on line 4—4 of Fig. 1.
Figure 5:
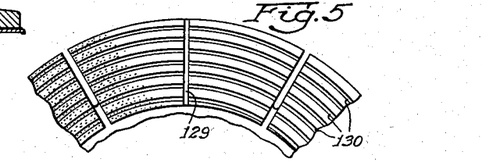
Fig. 5 is an elevational view of a driven clutch element in the transmission illustrated in Fig. 1.

The clutch assembly 17 comprises a flywheel 19 made up of a pair of sheet metal stampings 20 and 21 and a driving plate 22 connected to the flywheel by bolts 23. Two driving plates 24 and 25 are provided, in addition to the driving plate 22, and two driven plates 26 and 27 are provided. The clutch assembly comprises two friction clutches C-1 and C-2 with the plates 24, 26 and 22 making up the clutch C-1, and the plates 22, 27 and 25 making up the clutch C-2. The clutch plate 26 includes a friction vibration dampener 28 of a usual construction which is formed by slots 29 and 30 in the disc 26 proper and in a hub 31 respectively, and springs 32 disposed within the slots 29 and 30. The hub 31 is splined on the intermediate shaft 12, and the driven disc 27 is splined to the sleeve shaft 13.

The plates 24 and 25 are both connected with the plate 22 to rotate therewith, since all three of these plates are driving plates. An annular stamping 33 is connected to the driving plate 22 by means of the bolts 23, and the stamping 33 is provided with openings 34 in its outer edge for receiving bolts 35 which extend through the plates 24 and 25. The plate 25 extends loosely over the bolts 35, so that it may have movement with respect to the bolts, and springs 36 are disposed between the pressure plates 24 and 25 for yieldably holding the plates apart. Due to the annular stamping 33 and the bolts 35, the plates 24 and 25 both are connected to and are constrained to rotate with the plate 22.

The annular member 33 has riveted to it three annular members 37, 38 and 39. The members 37 and 39 are angular in cross section and are disposed on opposite sides of the member 38 which constitutes a divider for a pair of fluid pressure chambers 40 and 41.

The fluid chamber 40 is formed by the members 37, 38 and an annular piston 42. The piston 42 has a seal 43 of yieldable material in its outer periphery, and a similar seal 44 is provided in an axially extending lip portion 45 of the divider member 38. The piston 42 is adapted to slide on the seal 44, and the seal 43 slides within the annular member 37 when fluid under pressure is supplied within the chamber 40. The piston 42 has an axially extending flange portion 46, and axial motion of the piston 42 is transmitted thereby to the pressure plate 25 for moving the pressure plate toward the plate 22 to engage the driven disc 27 therebetween.

A piston 47 is disposed within the annular member 39 and a sleeve portion 48 of the divider member 38 and is adapted to slide on the inner and outer surfaces respectively of these two members. The piston 47 is provided with a seal 49 in its outer periphery, and a seal 50 within its central opening which contact respectively the inner surface of the member 39 and the outer surface of the sleeve portion 48. The members 39, 38 and the piston 47 together form the chamber 41 within which fluid under pressure is effective to move the piston 47 to the right axially of the clutch assembly 17. The piston 47 is connected by means of an annular member 51 and the bolts 35 with the plate 24, so that axial movement of the piston 47 to the right as seen in the drawing is transmitted to the plate 24 to cause a similar movement of the plate to engage the driven disc 26 between the plate 24 and the plate 22. A passage 52 which extends through the divider member 38 is provided for supplying fluid under pressure to the chamber 40, and a passage 53 extending through the divider member is provided for supplying fluid under pressure to the chamber 41.

A plurality of centrifugal weights 54 are pivotally mounted on the clutch plate 25 and are connected by struts 55 with the plate 24. As will be hereinafter described in greater detail, these weights function to counteract the centrifugal force due to residual fluid within the chambers 40 and 41 for holding the clutches C-1 and C-2 disengaged when no engagement is intended.

A pump 56 having a rotor 57 is driven from the shaft 10. The connection with the shaft 10 is through a sleeve 58 connected with the annular member 38, which, as has been described, is connected with the shaft 10.

The planetary gear set 18 comprises a ring gear 59 connected with the driven shaft 11, sun gears 60 and 61 connected with and formed integrally with the shafts 13 and 12 respectively, elongated planet gears 62 (one being shown in the drawing) in mesh with the sun gear 60 and ring gear 59 and planet gears 63 (one being shown in the drawing) in mesh with the sun gear 61 and each in mesh with a planet gear 62. A planet gear carrier 64 is provided for the gears 62 and 63, and the gears are rotatably disposed in the carrier. The carrier is rotatably disposed on the driven shaft 11 and on an axially extending sleeve portion 65 of the annular part 15.

A one-way brake 66 is provided between the carrier 64 and the part 15. The brake 66 may be of any suitable construction and is shown as comprising tiltable sprags 67 disposed between outer and inner cylindrical surfaces 68 and 69 formed in the carrier 64 and on the sleeve portion 65. The part 15 and its portion 65 are fixed within the housing 14 so that the carrier is braked when the brake 66 engages.

A friction brake 70 is provided for the sun gear 60 and comprises a brake drum 71 splined to the shaft 13 and a brake band 72 adapted to contract on the drum. A friction brake 73 is provided for the carrier 64 and comprises a drum portion 74 on the carrier and a friction band 75 adapted to contract and grip the drum portion 74.

A fluid pressure operated piston 76 slidably disposed in a housing portion 77 is provided for engaging the friction band 75. The piston 76 is connected by means of a lever 78 and a strut 79 with one end of the band, and the other end of the band is anchored with respect to the transmission casing 14 by means of a strut 80. A spring 81 is provided for yieldably holding the piston 76 in its brake disengaging position.

A similar hydraulic operator for the friction band 72 is employed and comprises a hydraulic piston 82 slidably disposed in a casing portion 83 and connected by a strut 84 with one end of the band 72. The other end of the band 72 is anchored with respect to the transmission casing by means of a strut 85.

A fluid pump 86 comprising a rotor 87 is adapted to be driven by the driven shaft 11 of the transmission. The rotor 87 is splined to the shaft 11 for this purpose.

An oil pan 88 is provided on the bottom of the transmission and forms a lubricating oil sump 89. The pump 56 has an inlet conduit 90 within the sump 89, and the pump 86 has an inlet conduit 91 within the sump. The portion 14a of the transmission housing surrounding the clutch assembly 17 also provides an oil sump 92. A conduit 93 is provided in the transmission housing 14 having its inlet 94 adjacent the periphery of the flywheel 19 so that rotation of the flywheel will throw oil from the sump 92 into the passage 93 and return it to the main sump 89.

In operation, the transmission provides three forward speed ratio drives and a drive in reverse. Low speed forward drive through the transmission is obtained by engaging the clutch C-1. The clutch C-1 is engaged by admitting fluid under pressure to the fluid chamber 41 through the passage 53, so as to move the piston 47 to the right as seen in Fig. 1 and thereby cause a movement of the pressure plate 24 in the same direction due to the connection between the pressure plate and piston through the annular member 51 and the bolts 35. Engagement of the clutch C–1 completes a drive from the drive shaft 10 through the flywheel 19, the bolts 23, the clutch plates 24 and 22, the driven disc 26, the shaft 12, the sun gear 61, the planet gears 63 and 62, and the ring gear 59 to the driven shaft 11. The one-way brake 66 acts in this case to brake the planetary gear carrier 64 and hold it stationary, and the carrier acts as the reaction element of the gear set. Since the drive is through both the pinions 63 and 62, the ring gear 59 and thereby the shaft 11 are rotated at a reduced speed forward drive with respect to the shaft 12 and thereby the shaft 10.

A drive in second speed forward ratio is subsequently obtained by engaging the brake 70 and allowing the clutch C–1 to remain engaged. The shaft 12 is driven from the shaft 10 as before. The brake 70 holds the gear 60 from rotation, and the gear 60 in this case constitutes the reaction element of the gear set. The planetary carrier 64 now rotates in the forward direction, and the one-way brake 66 overruns. Since the sun gear 60 is larger than the gear 61 and is in engagement with the elongated sun gears 62, the driven shaft 11 is driven at a higher or intermediate reduced speed forward drive.

Third speed forward drive, which is a direct drive, is obtained by disengaging the brake 70 and engaging the clutch C–2, allowing the clutch C–1 to remain engaged. Engagement of the clutch C–2 is obtained by applying fluid under pressure to the piston 42 through the passage 52 thereby moving the piston 42 to the left as seen in Fig. 1 and causing a similar movement of the pressure plate 25, so that the driven plate 27 is engaged between the plates 22 and 25. The shaft 13 connected with the plate 27 is thereby driven directly by the drive shaft 10 as is the shaft 12. Both of the sun gears 60 and 61 thereby rotate and are driven by the drive shaft 10, and the gear set 18 is locked up, that is, all of its parts rotate together with no relative motion between the parts, and the ring gear 59 and driven shaft 11 are thereby driven in direct drive with respect to the drive shaft 10.

A reverse drive is obtained by engaging the clutch C–2 and engaging the brake 73. The shaft 13 is driven directly by the shaft 10 with this clutch engaged, and the ring gear 59 and shaft 11 are driven through the planetary gears 62 from the sun gear 60 and rotate in the reverse direction at a reduced speed ratio. The reaction member of the gear set in this case is the planetary gear carrier 64 which tends to rotate in the forward direction, that is, in the same direction the shaft 10 is driven which is indicated by the arrow A and the brake band 75 engages the drum 74 and brakes it from any such rotation.

As has been described, the one-way brake 66 functions to hold the gear carrier 64 stationary for completing the low speed forward drive. This drive is thereby a one-way drive. The brake 73 is also effective on the planetary gear carrier 64, and this brake may be engaged in order to render this drive a two-way drive, instead of a one-way drive, if desired.

Figure 6:
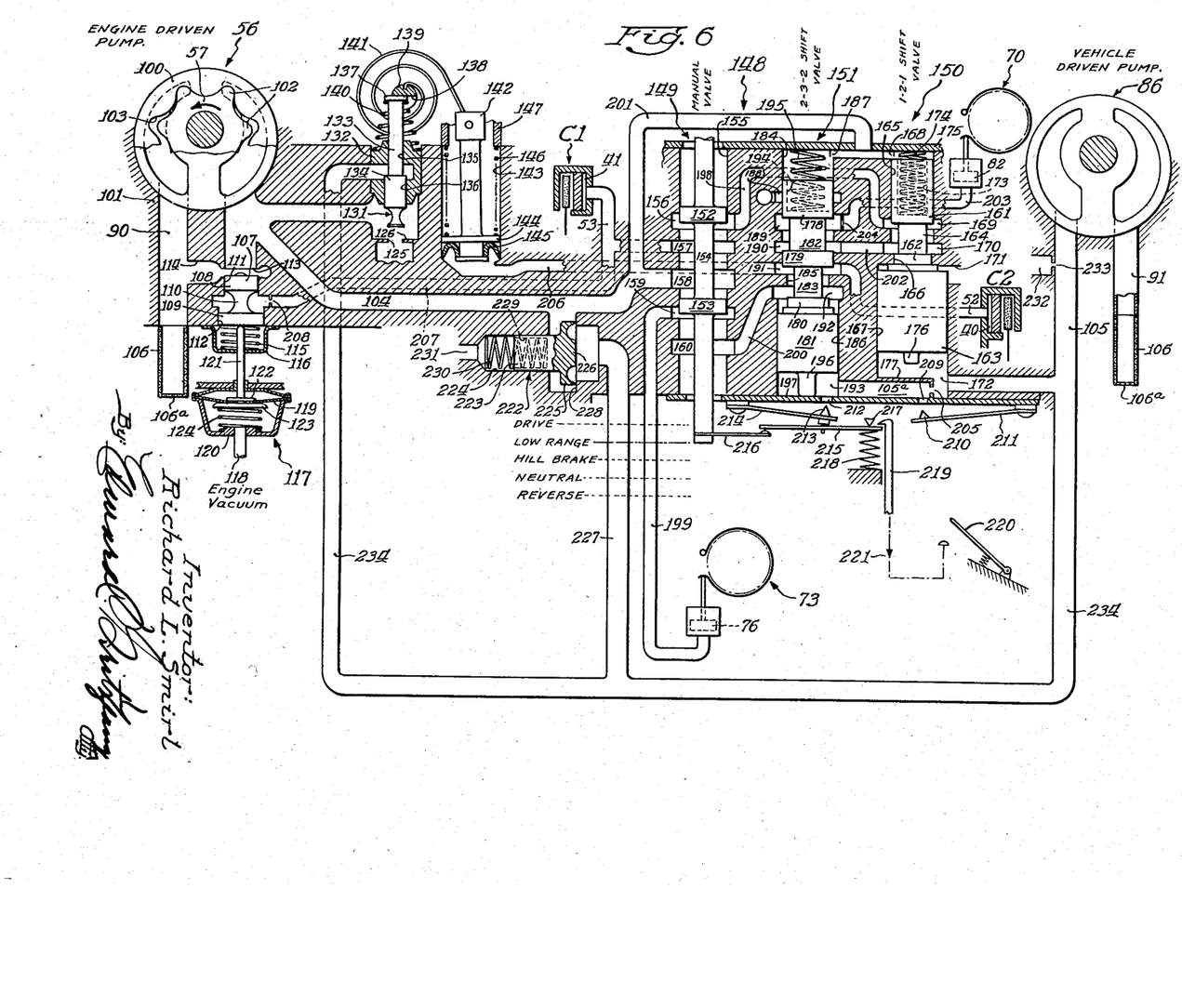
Fig. 6 is a diagrammatic illustration of one embodiment of my improved control system for the transmission shown in Figs. 1 to 5.

Referring to Fig. 6, the control system for the transmission above described comprises the drive shaft pump 56 and the driven shaft pump 86. The drive shaft pump 56 comprises the rotor 57 and an outer rotatable member 100 which is rotatably disposed in a pump casing 101. The rotor 57 is provided with a plurality of lobes 102, and the outer member 100 is provided with a plurality of cavities 103 into which the lobes may enter. The inner and outer members are eccentrically disposed with respect to each other, and as will be noted, there is one more cavity 103 than there are lobes 102. The shapes of the inner and outer members 57 and 100 are such that all of the lobes 102 are in contact with the inner surface of the outer member 100 and form a substantially fluid tight connection with the inner surface of the outer member. The pump 56 has an inlet conduit 90 and a discharge conduit 104, and as will be readily understood, when the rotor 57 is rotated in the direction indicated in Fig. 6, causing rotation in the same direction of the outer member 100, a suction will be created in the conduit 90, tending to draw lubricating oil into the pump and any such fluid will be discharged into the conduit 104. The driven shaft pump 86 is similar in construction to the drive shaft pump 56 and functions in the same manner as the pump 56. The pump 86 has a discharge conduit 105 and the intake conduit 91 which was previously mentioned.

As shown in Fig. 1, the inlet conduits 90 and 91 extend downwardly into the oil sump 89 formed by the pan 88 to have their inlet ends 90a and 91a at the bottom of the sump 89. The inlet ends of the conduits 90 and 91 each is provided with an oil screen 106 which is closed on its end 106a. The oil screen is of relatively fine mesh and in one particular embodiment of the controls had openings approximately .006 inch wide and was about 80 square inches in area. The purpose of this screen on each of the pump inlet conduits is to provide a so-called viscous restriction through which the oil taken into the pumps must pass and which will be retarded in its flow due to the frictional contact of the oil on the substantial surface area of the sides of the screen openings, more or less depending on the temperature and the resulting viscosity of the oil, for purposes to be hereinafter described. Various other types of viscous restrictions such as those illustrated and described in my aforementioned copending application, Serial No. 94,580, filed May 21, 1949, may be utilized.

The discharge conduit 104 is connected with a pressure control valve 107. The valve comprises lands 108 and 109 of different diameter separated by a groove 110 and slidably disposed in cylinder portions 111 and 112 respectively. The piston is adapted to block a port 113 which connects the discharge conduit 104 with a passage 114 connected with the inlet conduit 90. A spring 115 is effective on the lower end of the valve 107 and is disposed in a spring casing 116. A vacuum motor 117 is provided for applying a force on the piston 107 in addition to that provided by the spring 115. The motor is connected by a conduit 118 with the fuel intake manifold of the vehicle engine (not shown) in which a vacuum generally exists as will be further described. The motor 117 comprises a flexible diaphragm 119 fixed about its periphery within a casing 120. A longitudinally movable rod 121 adapted to contact the piston 107 is longitudinally movable within the casing 120 and is connected with the diaphragm 119 by means of washers 122 and 123. A compression spring 124 is provided between the washer 123 and the lower end of the casing 120 which is effective to hold the rod 121 in its illustrated position bearing against the piston 107 (assuming the vacuum within the lower portion of the casing 120 is not sufficient to pull the diaphragm 119 and rod downwardly to separate it from the piston 107).

The discharge conduit 104 is connected with an orifice 125, which in contrast with the viscous restriction to the flow of the lubricating oil provided by the screen 106, provides a turbulent sudden restriction to the flow of oil. The orifice 125 is sharp edged and constitutes an opening in a thin plate 126. The orifice is disposed so as to discharge into a passage 127 which extends through the sleeve portion 48, and the passage 127 discharges oil into the annular member 33 and on to the clutch disc 27. The disc 27 is provided with openings 128 so that some of the oil may also pass on to the clutch disc 26. The discs 26 and 27 are provided with radial grooves 129 and spiral grooves 130 in their friction surfaces through which the fluid flowing through the passage 127 may escape, and this fluid functions to cool the clutch discs. The thin plate orifice 125, as will be hereinafter more fully described, functions to provide a fluid pressure in the discharge conduit 104 from the pump 56 that increases progressively with the speed of the drive shaft 10 of the transmission with which the pump is drivingly connected for supplying a fluid pressure that gives a smooth engagement to a starting clutch in the transmission. Although thin plates of different thicknesses may be used, I have found in one particular embodiment of the invention that a plate of .023 inch thickness having an orifice 125 therein of .187 inch in diameter provided satisfactory results.

A plunger valve 131 is slidably disposed in a fixed sleeve 132 and is movable toward and away from the plate 126 to thereby effectively open and close the orifice 125. The plunger 131 has lands 133 and 134 of respectively smaller and larger diameters and the lands 133 and 134 are respectively disposed in cylinders 135 and 136 formed in the sleeve 132. The plunger 131 is provided with an enlarged head portion 137 adapted to contact the flat side 138 of a rotatable shaft 139. A spring 140 is provided between the head portion 137 and the sleeve 132 for holding the head portion 137 in contact with the flat surface 138. One end of a helical thermostatic element 141 is fixed to the shaft 139 for rotating the shaft with an increase in temperature, and the other end of the spring 141 is fixed to a piston 142 as shown. The helical element 141 is so disposed in the transmission casing as to be at substantially the temperature of the oil in the sump 89.

The piston 142 is slidably disposed in a cylinder 143 and comprises an enlarged head 144 at its lower end having a flexible annular sealing ring 145 disposed on the head 144. A compression spring 146 is disposed between the head 144 and a fixed sleeve portion 147 at the upper end of the cylinder 143 for yieldably holding the piston in its illustrated position.

Oil pressure is supplied to the various clutches and brakes for controlling the transmission by means of valve mechanism 148. The valve mechanism comprises a manually operated valve 149, an automatically operable first speed ratio to second speed ratio shift valve 150, and an automatically operable second speed ratio to third speed ratio shift valve 151. The manual valve 149 comprises lands 152 and 153 and a groove 154 between the lands. The valve is slidably disposed in a cylindrical cavity 155. The cylindrical cavity 155 is provided with ports 156, 157, 158, 159 and 160. The valve 149 may be connected by any suitable linkage with any mechanism (not shown) conveniently accessible to the operator of the vehicle, so that the valve can be manually shifted.

The second speed shift valve 150 comprises lands 161, 162, 163 and a groove 164 between the lands. The lands 162, 161 and 163 are of increasing diameter in the order named. The valve 150 is slidably disposed in cylinder portions 165, 166 and 167 which respectively fit the lands 161, 162 and 163. The cylinder portions 165, 166 and 167 are provided with ports 168, 169, 170, 171 and 172, as shown. The valve 150 is provided with a cavity 173 in its upper end, and a compression spring 174 is disposed within the cavity and between its inner end and a housing portion 175. The piston 150 on its other end is provided with a nodule 176 adapted to contact a casing portion 177 for limiting the downward movement of the valve.

The third speed valve 151 comprises lands 178, 179, 180 and 181 and grooves 182 and 183. The lands 180, 179 and 181 are progressively greater in diameter in the order named, and the land 178 is the same diameter as the land 179. The lands 178 and 179 are slidably disposed in a cylinder portion 184; the land 180 is slidably disposed in a cylinder portion 185; and the land 181 is slidably disposed in a cylinder portion 186. The cylinder portions 184, 185 and 186 are provided with ports 187, 188, 189, 190, 191, 192 and 193. The piston 151 is provided with a cavity 194 in its upper end, and a compression spring 195 is disposed in the cavity and between the end of the cavity and the casing portion 175. The valve 151 is provided with a nodule 196 on its other end for contacting the housing portion 197 for limiting the downward movement of the valve.

The port 156 for the valve 149 is connected with the port 169 for the valve 150 by means of a conduit 198. The port 157 for the valve 149 is connected with the fluid pressure chamber 41 for the clutch C–1 by means of the conduit 53. The port 158 is connected with the pump discharge conduit 104. The port 159 is connected with the piston 76 for the brake 73 by means of a conduit 199. The port 160 is connected with the port 192 for the valve 151 by means of a conduit 200.

The port 168 for the valve 150 is connected with the port 187 for the valve 151 and also with the pump discharge conduit 104 by means of the branch conduit 201. The port 170 for the valve 150 is connected with the port 190 for the valve 151 by means of a conduit 202. The port 171 for the valve 150 is a bleed port adapted to discharge into the sump 89. The port 172 is connected with the pump discharge conduit 105 for the pump 86.

The port 188 for the valve 151 is a bleed port connected with the sump 89. The port 189 for the valve 151 is connected by means of a conduit 203 with the piston 82 for the brake 70; and a restricted orifice 204 is in the conduit 203 for retarding the flow of fluid therethrough. The port 191 is connected by means of the passage 52 with the fluid pressure chamber 40 for the clutch C–2. The port 193 is connected with the pump discharge conduit 105 through a restriction 205, the purposes of which will be hereinafter described.

The fluid pressure chamber 40 for the clutch C–2 is also connected with the piston 142 by means of the conduit 206 for actuating the piston 142. The fluid pressure chamber 41 for the clutch C–1 is connected with the valve 107 by means of a conduit 207, and a restriction 208 is in the conduit.

The pressure in the discharge conduit 105 for the pump 86 regulates according to the speed of the driven shaft 11 by means of which the pump is driven. The regulation is obtained due to the action of the viscous restriction formed by the screen 106 on the pump inlet 91 and a turbulent restriction provided by a sharp edged orifice 209 formed in the casing portion 197 and connected through the orifice 205 with the discharge conduit 105. The orifice 209 is adapted to be opened and closed to a greater or less extent by means of a valve element 210 carried by a bimetallic strip 211. The strip 211 is located within the transmission casing 14 at any suitable position so as to be at substantially the temperature of the lubricating oil within the sump 89. The bimetallic strip 211 is so arranged as to move the valve element 210 to close the orifice 209 to a greater extent when the lubricating oil increases in temperature.

Another orifice 212 for relieving fluid from the pump discharge conduit 105 to the sump 89 is in communication with the conduit 105 through the orifice 205, and a valve element 213 carried by a spring strip 214 is provided for closing this orifice. The valve element 213 is adjusted in position by means of a walking beam 215 acted on at one end by an arm 216 carried by the valve 149. The walking beam 215 is adapted to rest on a stop 217 at its other end and is acted on by a compression spring 218 opposite the stop. The beam 215 at this end is adapted to be acted on also by a catch link 219 actuated by the accelerator 220 of the motor vehicle, the arrangement being such that the link 219 is pulled in the direction of the arrow 221 when the accelerator 220 is moved to an open throttle position. It will, of course, be understood that the accelerator 220 is connected by the usual linkages (not shown) with the carburetor of the vehicle motor.

A check valve 222 is provided for connecting the conduits 105 and 104 under certain conditions. The valve 222 comprises a piston 223 slidably disposed in a cylinder 224 and an enlarged end portion 225. The end face 226 of the enlarged portion 225 is connected to be exposed to the fluid pressure in the conduit 105 by means of a conduit 227 and is adapted to contact with its edges a valve face 228 for closing the conduit 227. The valve 222 in its piston 223 is provided with a cavity 229, and a spring 230 is provided within the cavity 229 and is disposed between the end of the cylinder 224 and the inner end of the cavity 229. The cylinder 224 is drained to the sump 89 by means of a conduit or passage 231.

A conduit 232 connected by means of a restriction 233 with the discharge conduit 105 for the rear pump 86 is provided for supplying lubricating oil under pressure to any of the various parts in the transmission that may require it.

The discharge conduit 105 for the driven shaft pump 86 is also connected with the valve 131 by means of a conduit 234 so as to impose the pressure within the conduit 105 on to the land 134 of the valve.

In the operation of the above described transmission controls, the transmission is conditioned for various types of operation by means of the valve 149 which is adapted to be manually controlled by the operator of the vehicle. The valves 150 and 151 are automatically controlled valves, which, as will hereinafter appear, cause shifting of the transmission from low to intermediate and from intermediate to high speed ratios. The valve 149 is shown in its neutral position in Fig. 7 in which position it causes the transmission to be in neutral condition. The vehicle engine driving the pump 56 is assumed to be operating, and there is this oil under pressure in the discharge conduit 104. There is, therefore, fluid pressure at the valve port 158 connected with the conduit 104, and the fluid pressure at the port 158 flows through the groove 154 and through the port 159 and conduit 199 to the piston 76 for engaging the brake 73. The engagement of the brake 73 conditions the transmission for a reverse drive which may be subsequently completed by engagement of the friction clutch C–2, and this engagement of the brake 73 in the neutral condition of the transmission assures that the friction clutch C–2 rather than the brake 73 is the friction engaging means that actually completes the reverse drive. It will be noted that the conduit 53 connected with the piston 47 for the clutch C–1 is drained past the upper land 152, and the conduit 52 connected with the piston 42 for the clutch C–2 is drained through the port 191, the groove 183, the port 192, the conduit 200 and the port 160 past the lower land 153 of the valve 149, to maintain both the clutches C–1 and C–2 disengaged.

Figure 8:
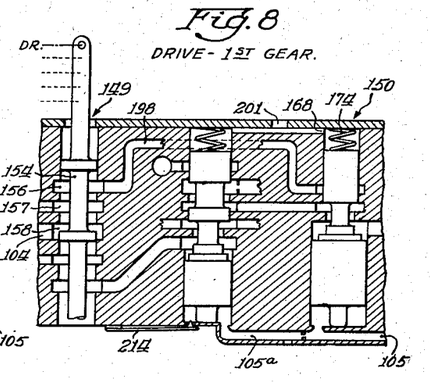

The transmission is conditioned for automatic drive by moving the valve 149 into its "drive" position at it is shown in Fig. 8. In this position of the valve 149, the piston 47 for the clutch C–1 is connected with the pump discharge conduit 104 through the port 158, the groove 154, the port 157 and the conduit 53. The conduit 198 is also connected with the groove 154 by means of the port 156; however, in the illustrated position of the valve 150, this conduit 198 is blocked. The clutch C–1 is thus connected for engagement by fluid pressure existing in the conduit 104.

The function of the thin plate orifice 125, like the corresponding orifice in the transmission controls shown in my aforementioned copending application, Serial No. 94,580, filed May 21, 1949, is to provide a fluid pressure in the discharge conduit 104 from the drive shaft pump 56 that increases with the output of the pump and thereby with the speed of the drive shaft 10. The orifice 125 may be considered as a turbulent type orifice, that is, one through which the flow of fluid is not smooth but is turbulent and has a multitude of eddies, and the turbulence in fluid flow I consider to be attained due to the fact that the orifice is sharp edged and is formed in a thin plate. The conduit 104, as has been described, in the Fig. 8 position of the valve 149 is connected with the piston 47 for the clutch C–1, and this fluid pressure that increases with drive shaft speed is thereby applied to engage the clutch C–1. The engagement that is given the clutch C–1 thus varies in intensity according to the speed of the vehicle engine, so that the net result is a smooth completion of the first speed power train through the transmission when the vehicle accelerator is depressed for starting the vehicle. As has been described, the orifice 125 discharges to the sump 89, the discharge being through the passage 127 to the clutch 26 and 27. This fluid flows through the grooves 129 and 130 in the clutch discs, and the clutch disc 26 in particular is cooled as it slips on the engaging plates 24 and 22 in providing this gradual completion of the first speed power train.

During this engagement of the clutch C–1, the pressure control valve 107 substantially closes the port 113, through which fluid from the discharge conduit 104 is relieved under certain conditions to flow through the passage 114 back into the pump inlet conduit 90. The pressure control valve 107 is so arranged to allow the pressure in the conduit 104 to increase sufficiently so that the clutch C–1 is completely engaged without slippage before the control valve 107 functions to further limit the increase in fluid pressure in the conduit 104. When the fluid in the conduit 104 has increased sufficiently so that the clutch C–1 is completely engaged, then the valve 107 moves downwardly as seen in Fig. 6 to open the port 113 and allow part of the discharge of the pump 56 to flow back into the inlet conduit 90, and the action of the piston 107 is a regulating action, that is, the valve 107 moves in this direction only sufficiently to maintain a predetermined pressure within the conduit 104. This predetermined pressure varies with the torque output of the vehicle engine and with the torque demand by the vehicle operator as evidenced by the position in which he puts the vehicle accelerator 220, utilizing the vacuum motor 117 connected with the fuel intake manifold of the vehicle engine for this regulating action.

As is well known, the pressure existing in the fuel intake manifold of an ordinary automobile internal combustion engine varies with the engine output torque, the torque demand and position of the vehicle accelerator, and the pressure in the manifold is exerted on the diaphragm 119 of the vacuum motor 117. As the engine output torque and the torque demand and corresponding accelerator depression become greater, the absolute manifold pressure increases (or the manifold suction decreases) and tends to allow movement of the rod 121 of the motor 117 upwardly as seen in Fig. 6 due to the action of the spring 124 in the motor. The valve 107 has four forces acting on it, namely, the force due to the pressure in the conduit 104 on its upper end, the force from the rod 121 on its lower end, the force from the spring 115 on its lower end, and also a force due to the fluid pressure applied to the piston 47 for the clutch C–1 which is applied on the lands 109 and 108 of the valve 107 through the conduit 207. Since the land 109 is of greater diameter than the land 108, the latter force functions to move the valve 107 downwardly as does the fluid pressure within the conduit 104. The rod 121 and the spring 115 tend to move the valve 107 upwardly. These four forces balance each other to regulate the fluid pressure in the conduit 104. As the absolute manifold pressure increases, the spring 124 is of greater effectiveness and holds the valve 107 in a position closing the port 113 until a greater pressure is obtained in the conduit 104, and the regulated pressure in the conduit 104 is greater. The action of the valve 107 is opposite for decreases in torque demand. The force on the valve 107 due to the existence of pressure in the chamber 41 for the clutch C–1 simply assures that the pressure in the conduit 104 is at a predetermined less value when the clutch C–1 is engaged as compared to the condition in which the clutch C-1 is disengaged. As is apparent from a study of the operation of the transmission, the clutch C-1 is engaged for all forward drives, but is disengaged for a reverse drive, and thus the pressure in the conduit 104 is regulated at predetermined less values for forward drive as compared with reverse drive. The restriction 208 in the conduit 207 is simply for the purpose of preventing undulations or rapid hunting movements of the valve 107 under the influence of pressure within the chamber 41 for the clutch C-1.

The regulating valve 107 thus functions to provide a greater regulated fluid pressure in the conduit 104 when the torque demand is greatest and a less fluid pressure in the conduit 104 when the torque demand is less. Thus, it will be clear that the turbulent orifice 125 initially causes an increase in fluid pressure within the conduit 104 which varies with the increase in drive shaft speed until the pressure is reached which the regulating valve 107 is effective to maintain, and the valve 107 is then solely effective, exclusive of the orifice 125, to regulate the pressure in the conduit 104. The turbulent orifice 125 thus functions to initially smoothly engage the clutch C-1 and the regulating valve 107 subsequently functions to vary the engaging pressure of the clutch C-1 (and of the other clutch and brakes which may be subsequently connected with the conduit 104) with variations of torque output of the engine.

The valve 107 and the motor 117 are so arranged and connected with each other that there is a predetermined limit below which the valve 107 and motor 117 are ineffective to lower the pressure in the conduit 104 due to a decrease in engine output. It will be noted that the rod 121 simply rests on and contacts the valve 107, assisting the spring 115 in holding the valve 107 upwardly against action of the fluid pressure in the conduit 104. When the absolute pressure in the motor 117 and intake manifold decreases to a predetermined value (or the vacuum in the manifold and motor 117 increases to a predetermined value), the rod 121 simply moves away from and disestablishes contact with the valve 107, so that the spring 115 is thereafter solely effective for holding the valve 107 against the fluid pressure on its upper end. As will be further explained, the purpose of this arrangement is to prevent such a decrease in fluid pressure in the conduit 104, which is applied to the pistons for the brakes and clutches for establishing drives through the transmission, as would otherwise normally occur when the accelerator is completely released and the vehicle is moving down a hill, for example, so that the brakes and clutches do not release to break the drive.

The turbulent orifice 125 is effective, as has been described, to provide a fluid pressure in the pump discharge conduit 104 that increases with drive shaft speed; however, as is well known, the viscosity of oil varies considerably with temperature. If no mechanisms for compensating for temperature changes were provided, the fluid pressure in the discharge conduit 104 would still vary in accordance with drive shaft speed due to the turbulent orifice 125, but the pressure would increase faster with lower oil temperatures than with higher oil temperatures, and the engagement of the starting friction clutch C-1 would thus vary with temperature. I provide two mechanisms for compensating for temperature variations, and these are the thermostat 141 and the viscous restriction in the intake conduit 90 of the pump 56 which is in the form of a fine mesh screen 106.

The thermostat 141 is within the transmission casing 14 as is the rest of the control mechanism shown in Fig. 6, and the thermostat is located so that it has oil splashed on to it, such as from the channel 93, and the thermostat is thus substantially at the temperature of the oil within the sump 89. As would be expected, the greater the viscosity and the thicker the oil with decreased temperature, the greater would be the force required to cause it to flow through the turbulent orifice 125, and the higher would be the fluid pressure in the conduit 104. The thermostat 141 is thus arranged so that as the oil temperature increases, the plunger 133 is moved downwardly as seen in Fig. 6 toward the plate 126 to decrease the effective size of the orifice 125, and as the oil temperature decreases, the plunger 133 moves upwardly to increase the effective size of the orifice 125. The thermostat functions in this manner by winding up and rotating the shaft 139 counterclockwise as seen in Fig. 6 with an increase in temperature and back in the opposite direction with a decrease in temperature. The flat face 138 with a rotation of the shaft 139 in the counterclockwise direction acts on the upper end 137 of the plunger 131 and forces the plunger 131 downwardly as seen in Fig. 6 against the action of the spring 140.

The piston 142 fixed to the outer end of the helically coiled thermostat 141 is sometimes effective for changing the position of the thermostat and affecting its operation on the piston 131; however, as will be noted, the piston 142 is connected by means of the conduit 206 with the chamber 40 for the clutch C-2 which is not engaged for low speed forward drive, and hence the spring 146 acting on the piston 142 is effective to hold the piston in its illustrated position for low speed gear drive through the transmission. It will be noted also that the pressure within the conduit 105 for pump 86 is effective on the land 134 through conduit 234; however, for starting conditions, the pressure in the conduit 105 is substantially zero, since the driven shaft 11 is not rotating or is rotating very slowly, and the plunger 131 is substantially unaffected from this source. When the vehicle increases in speed, the pressure within the discharge conduit 105 for the driven shaft pump 86 increases as will hereinafter be described, and this pressure is applied on the upper end of the land 134 to move the plunger 131 out of contact with the shaft 139 and close the orifice 125 so as to stop any unnecessary discharge of fluid through the orifice 125, inasmuch as the orifice 125 is only utilized for initially completing a drive through the transmission and the valve 107 subsequently is the sole regulator for the pressure within the conduit 104.

The viscous restriction in the intake conduit 90 in the form of the fine mesh screen 106 functions to increase the resistance to flow into the conduit 90 with increased viscosity of the oil due to decreased temperature. The screen 106 in effect provides in the path of oil flow into the intake conduit 90 numerous friction surfaces which aggregate a substantial area over which the oil flows, and the frictional resistance to the flow of oil, as will be readily understood, is greater, the greater the viscosity of the oil. The effect of the screen 106 is thus to reduce the flow of oil to the pump 56 at low temperature and tend to compensate for the increased resistance to the flow of oil through the turbulent orifice 125.

In connection with the variations of oil viscosity with temperature, it may be noted at this point that the thin sharp edged type orifice 125 formed in the thin plate 126 creates a turbulent flow of oil and is relatively less affected by viscosity changes than an orifice formed out of a thicker plate and interposing substantial surface area over which the fluid flows. The thin sharp edged type orifice 125 and the viscous orifice consisting of the screen 106 substantially compensate for each other for changes in temperature above and below a certain temperature, such as 70° Fahrenheit in one particular case, so that the increase in fluid pressure in the discharge conduit 104 remains the same for increases in drive shaft speed regardless of temperature changes of the oil. Above this particular temperature, which was 70° Fahrenheit in the particular case noted, the thermostat 141 is effective to change the effective area of the orifice 125 so that changes in oil temperature will not substantially change the oil pressure in the pump output conduit 104, and below this temperature the viscous restriction is effective for per-forming the same result. It may be noted at this point, however, that the thermostat 141 is not effective to change the effective area of the orifice 125 substantially during any particular engagement of the vehicle starting clutch C-1, and the thermostat is relatively slow acting. The area of the orifice 125 for any particular engagement of the clutch C-1 is thus substantially fixed and non-changing.

The fluid pressure in the discharge conduit 105 for the driven shaft pump 86 is made to vary with the speed of the driven shaft 11 by substantially the same arrangement as is utilized for causing the fluid pressure in the conduit 104 for the pump 56 to vary in accordance with the speed of the drive shaft 10. The arrangement used in connection with the driven shaft pump 86 is the screen 106 on the inlet end of the intake conduit 91 and the sharp edged orifice 209 which is thermostatically increased and decreased in effective size by means of the bimetallic strip 211 carrying the valve element 210. The strip 211 like the helical thermostatic element 141 is at substantially the same temperature as the oil in the sump 89, and when the oil increases in temperature, the thermostatic element 211 changes in shape and moves the valve element 210 toward the orifice 209 to decrease the effective size of the orifice, and the valve element 210 on a decrease in temperature is moved back away from the orifice 209 to increase its effective size. The orifice 205 between the orifice 209 and the pump 86 is for the purpose of providing a differential in pressures between that in the conduit 105 and the conduit portion 105a at times and for purposes to be hereinafter described.

With the valve 149 being in its "drive" position, the walking beam 215 is pivoted about the stop 217 so as to move the leaf spring 214 and its valve element 213 to close the orifice 212. With the orifice 212 being closed, the sole regulating outlet for the conduit 105 is the orifice 209, and the orifice 205 is sufficiently large so that the discharge through the orifice 209 is not sufficient to cause a substantial difference in pressures between that existing in the conduit 105 and the conduit portion 105a at this time.

The shift from low speed ratio to second speed ratio is made automatically by the valve 150. The valve 150 has three forces acting on it in its Fig. 8 position, namely, the force due to the fluid pressure in the pump discharge conduit 105 acting on the lower end of the valve, the force due to the spring 174 acting on the upper end of the valve, and the force due to the fluid pressure in the conduit 104 which is applied to the upper end of the valve through the conduit 201 and the port 168. The fluid pressure in the conduit 105 varies with the speed of the driven shaft 11 as has been described, and the fluid pressure in the conduit 104 varies with the torque output of the vehicle engine, at this time, after the clutch C-1 has once been engaged. The pressure varies in this manner in the conduit 104 regardless of whether the turbulent orifice 125 has been completely closed or not, after engagement of the clutch C-1. Above a predetermined speed of the driven shaft 11, however, such as a speed corresponding to 15 miles per hour of the vehicle, for example, the pressure in the conduit 105 impressed on the upper end of the land 134 through the conduit 234 is effective to close the turbulent orifice 125 completely by moving the valve 131 downwardly. When the fluid pressure in the conduit 105 varying with the speed of the driven shaft 11 and speed of the vehicle increases sufficiently to overcome the forces on the upper end of the valve 150 from the spring 174 and that due to the fluid pressure varying with engine torque output, the valve 150 moves upwardly into its Fig. 9 position, corresponding to intermediate speed drive through the transmission.

Figure 9:
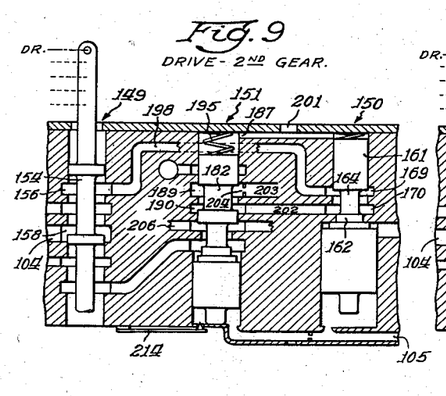

In the Fig. 9 condition of the valving, the fluid pressure from the conduit 104 varying with the engine torque is impressed on the piston 82 for the brake 70 for engaging the brake, through the port 158, the groove 154 of the valve 149, the port 156, the conduit 198, the port 169, the groove 164, the port 170, the conduit 202, the port 190, the groove 182 of the valve 151, the port 189, and the conduit 203. The restriction 204 in the conduit 203 functions to provide a gradual application of this fluid pressure to the piston 82 so as to give a smooth engagement of the brake 70 and a correspondingly gradual and smooth completion of the intermediate speed power train. In the Fig. 9 position of the valve 150, the fluid pressure in the conduits 198 and 203 is impressed on the lower end of the land 161 and the upper end of the land 162 which is smaller in diameter than the land 161, and this fluid pressure impressed on these unequal areas provides a fourth force effective on the valve 150 functioning to hold it in its second speed position in which it is illustrated in Fig. 9. As in low speed forward drive the engine torque variable fluid pressure in conduit 104 functions to provide a more forceful engagement of the friction engaging means completing the drive, which in this case is both the clutch C-1 and the brake 70, to give the friction engaging means a greater capacity, for a greater engine torque, so that no slipping can take place after engagement has once been attained.

Figure 10:
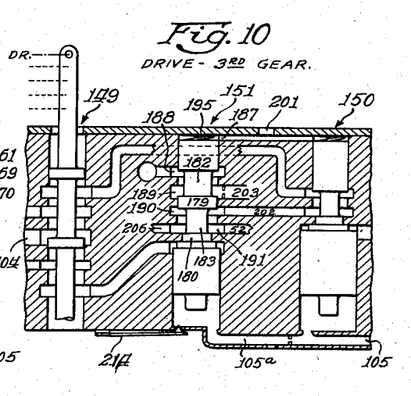

A shift into third speed forward drive from intermediate speed forward drive is attained automatically on a shift of the valve 151 from its Fig. 9 position to its Fig. 10 position. This valve, like the valve 150 in its low speed position, has three forces impressed on it, namely the driven shaft speed responsive force from the conduit 105 on the lower end of the valve, the force due to the spring 195 on the upper end of the valve and the engine torque variable force due to the fluid pressure in the conduit 104 impressed on the upper end of the valve through the conduit 201 and port 187. When a sufficient force, due to a predetermined increase in vehicle speed, is applied to the lower end of the valve 151 to overcome the forces on the upper end of the valve, the valve moves upwardly from its Fig. 9 position to its Fig. 10 position. The piston 82 for the brake 70 is drained to the sump through the conduit 203, the port 189, the groove 182 and the port 188, and the brake 70 is thus disengaged. The clutch C-2 is applied by fluid pressure from the conduit 202 which is connected to the conduit 104, as has been described, with the valve 150 in its upper position, and through the port 190, the groove 183, the port 191 and the conduit 52 connected with the C-2 fluid chamber 40. The clutch C-2 is thus applied and the brake 70 is disengaged to complete the third speed direct drive through the transmission. In the third speed upper position of the valve 151, the pressure in the conduit 202 is impressed on the lower face of the land 179 and on the upper face of the land 180 which is smaller in diameter than the land 179, and this provides a fourth force effective on the valve 151 tending to keep it in its third speed shifted position, similar to the same operation of the fluid pressure on the valve 150. In the third speed condition of the valving, the pressure applied to the piston 47 for the C-2 clutch is also applied through the conduit 206 to the piston 142, however, since the orifice 125 has already been closed by the fluid pressure in the conduit 234 impressed on the top of the land 134 of the plunger 131, this action of the piston 142 has no effect.

Figure 11:
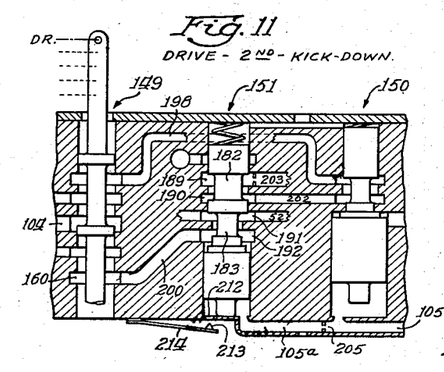

A downshift from third speed ratio to second speed ratio may be obtained by moving the accelerator 220 to its open throttle limit of movement to actuate the link 219 and move the walking beam 215 against the action of the spring 218 and allow the valve member 213 to open the orifice 212. Opening of the orifice 212 has the effect of reducing the pressure in the conduit portion 105a, whereupon the spring 195 and the fluid pressure from the conduit 104 overbalance the effect of the reduced fluid pressure on the lower end of the valve 151, so that the valve moves from its third speed position to its second speed position as shown in Fig. 11. The brake 70 is thus reengaged, and the clutch C-2 is disengaged. The piston 82 for the brake 70 has fluid pressure applied thereto from the conduit 202 through the port 190, the groove 182, the port 189 and the conduit 203. The piston 42 for the clutch C-2 is vented to the sump 89 through the conduit 52, the port 191, the groove 183, the port 192, the conduit 200 and the port 160 past the lower end of the valve 149 to the sump. With the orifice 212 opened in this manner, the orifice 205 connecting the conduit 105 with its conduit portion 105a has the effect of providing a differential in pressures applied to the bottom ends of the two valves 150 and 151, so that the valve 150 is also not moved from its upshifted position to its downshifted position.

The valve 149 may be shifted into its "low range" position in order to open the orifice 212 for downshifting the transmission similarly from third speed ratio to second speed ratio. The fluid connections to and from the valve 149 remain the same as when the valve is in its drive position, that is, the conduits 198 and 53 remain connected with the conduit 104. In this case, the arm 216 moves with the valve 149 to its position in which it is illustrated in Fig. 6 so as to allow the spring arm 214 to move the valve element 213 out of the orifice 212.

The valve 223 constitutes a relief valve for the discharge conduit 105 from the driven shaft pump 86. In normal operation of the transmission, assuming the selector valve 149 is in its "drive" position, the valve 226 will move away from its seat 228 after the pressure in the conduit 105 has increased beyond that necessary for shifting both of the valves 150 and 151 upwardly into their upshifted positions. The valve 226 thus relieves the rear pump 86 so that it does not unnecessarily pump against excessively high pressures. The valve 223 is provided with the enlarged end 225 having the pressures in the conduits 104 and 105 applied on opposite sides in order that the pressure in the conduit 104 will influence the pressure in the conduit 105 and will prevent an upshifting movement of the valve 151 into its third speed position under certain conditions when the selector valve 149 is in its "low range" position. It will be understood that the vehicle operator intends to remain in a speed ratio lower than high speed ratio for engine braking of the vehicle when he shifts the selector valve 149 into its "low range" position. Since the pressure in the conduit 104 increases with engine torque output and the degree of depression of the vehicle accelerator, the force on the valve 223 by the fluid pressure in the conduit 104 tending to hold the valve on its seat 228 is greater with high engine torque and greater accelerator depression. With the selector valve 149 in its "low range" position, the intermediate to high valve 151 would shift to its upshifted position at high car speeds with the engine accelerator released, as when coasting down a steep hill, were it not for the influence of the pressure in the conduit 104 on the pressure in the conduit 105 through the intermediary of the pressure relief valve 226. The pressure in the conduit 104 will be less with a released accelerator and will thus relieve the pressure in the conduit 105 at a lower pressure, so that it will not become sufficiently high to upshift the valve 151.

Figure 12:
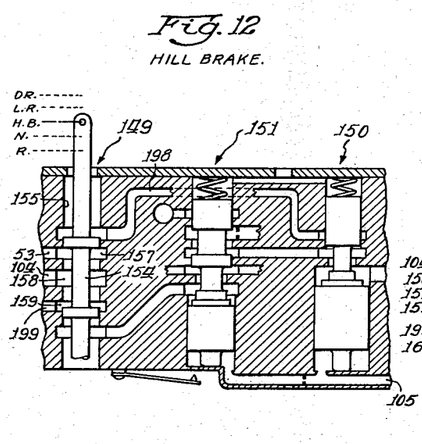

The transmission may be locked in a two-way drive low speed ratio for hill braking purposes by moving the selector lever 149 into its "hill brake" position as shown in Fig. 12. In this position, the valve 149 connects the ports 157, 158 and 159, so that the fluid pressure in the conduit 104 is applied to the ports 157 and 159 for engaging both the clutch C-1 and the brake 73. The chamber 41 for the clutch C-1 is connected by means of the conduit 53 with the port 157, and the piston 76 for the brake 73 is connected by means of the conduit 199 with the port 159 as has been described, and the ports 157, 158 and 159 are connected by means of the groove 154 in the valve 149. The conduit 198 which supplies fluid under pressure for engaging both the clutch C-2 and the brake 70 in this position of the valve 149 is vented to the sump 89 through the upper end of the cylindrical cavity 155 and past the land 152 of the valve 149. As has been previously explained, engagement of the clutch C-1 and the brake 73 completes a low speed two-way drive between the transmission shafts 10 and 11.

Figure 13:
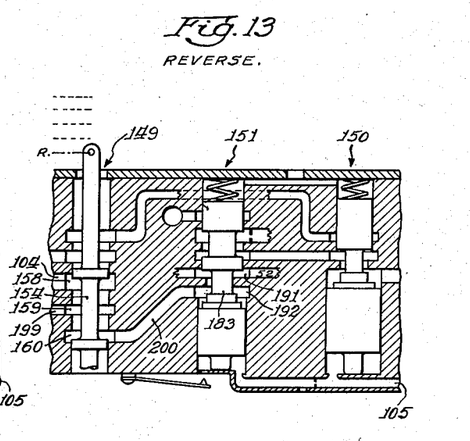

The transmission is shifted into reverse drive by moving the selector valve 149 into its "reverse" position in which it is shown in Fig. 13. In this position of the valve, its groove 154 connects the ports 158, 159 and 160 so that the fluid pressure from the conduit 104 is applied to the conduit 199 and thereby to the piston 76 for engaging the brake 73 and also to the conduit 200. The piston 47 for the clutch C-2 is connected to the conduit 200 and thereby with fluid pressure through the conduit 52, the port 191, the groove 183, and the port 192. Thus, both the clutch C-2 and the brake 73 are applied, and a drive is completed in reverse.

Figure 7:
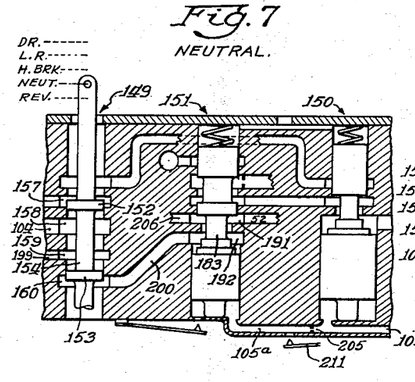
Figs. 7, 8, 9, 10, 11, 12 and 13 are views on an enlarged scale showing certain of the valves in the Fig. 6 arrangement in different positions of the valves for various drives through the transmission.

As has been previously explained in connection with Fig. 7 showing the neutral condition of the valve mechanism 148, the piston 76 for the brake 73 has fluid pressure applied thereto for engaging the brake also in the neutral condition of the selector valve 149 which assures that the brake 73 shall be engaged prior to the clutch C-2 in shifting into reverse drive. The pressure in the conduit 104 increases with the speed of the drive shaft 10 and the pump 56, as in connection with a start in low speed forward drive, and this pressure causes a gradual engagement of the clutch C-2 to complete the reverse power train. The pressure of the conduit 104, however, for any certain speed of the drive shaft 10 is higher than for forward drive due to two influences, namely, the application of fluid pressure from the piston 42 for the clutch C-2 to the piston 142 through the conduit 206 and the lack of fluid pressure application on the lands 108 and 109 of the valve 107 through the conduit 207.

As is shown in Fig. 1, the piston 42 for the clutch C-2 is of smaller size than the piston 47 for the clutch C-1, and hence a higher pressure is needed for the piston 42 for completing the reverse drive power train as compared with the completion of the low speed forward drive power train by the piston 47, since, in both cases, the friction clutch involved carries full engine torque. As has been previously explained, the application to the piston 42 for the clutch C-2 of the fluid pressure existing in the conduit 104 at the time of shift into high speed forward drive causes a smooth engagement of the clutch C-2 for high speed drive due to the smaller area of the piston 42 as compared with the piston 47. In high speed forward drive, however, the clutch C-2 carries only a part of the engine torque (the rest is carried by the clutch C-1), and hence the same magnitude of engaging force for the clutch C-2 for completing high speed forward drive as for the clutch C-1 in completing the low speed forward drive is not required.

The application of fluid pressure to the piston 142 through the conduits 206 and 52 causes a movement upwardly of the piston 142 against the action of the spring 146 and a consequent rotation of the spiral thermostatic element 141 in the counterclockwise direction as seen in Fig. 6. The plunger 131 is thereby moved closer to the thin plate 126 causing a greater closing of the orifice 125 for a start in reverse as compared with a start in low speed forward drive. The fluid pressure applied to the clutch C-2 is also applied to the piston 142 in high speed forward drive; however, by that time, the speed of the driven shaft 11 has reached a sufficiently high value to close the orifice 125 completely due to the pressure in the conduit 105 being impressed on the land 134 of the plunger 131 through the conduit 234. The partial closing of the orifice 125 by means of the piston 142 for reverse drive causes the pressure in the conduit 104 to increase faster than for a start in low speed forward drive.

In reverse drive, as has been explained, the clutch C–1 is not engaged, and hence there is no application of fluid pressure to the lands 108 and 109 of the valve 107 in reverse drive, and the springs 124 and 115 are more effective, and a greater fluid pressure is necessary in the conduit 104 before the valve 107 is moved to open the port 113. Hence the valve 107 regulates and maintains the pressure in the conduit 104 at a higher maximum value, subsequent to a gradual increase in the conduit due to the action of the orifice 125. It will be understood, however, that the valve 107 as before is effective to regulate the pressure in the conduit 104 in accordance with the output torque of the engine, but the pressure is at a predetermined higher value for the same engine output torque as compared with a drive in forward. Thus, the higher fluid pressure required for gradually completing the reverse drive and thereafter maintaining it is secured.

Figure 14:
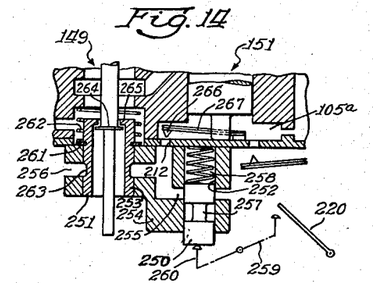
Fig. 14 is a partial view, similar to Fig. 6, showing another embodiment of the transmission controls.

The embodiment of the invention shown in Fig. 14 differs principally from that shown in Fig. 6 in that two valves 250 and 251 are used in lieu of the valve 213. The valves 250 and 251 are disposed respectively in cylinders 252 and 253 formed in a casing portion 254. The orifice 212 is connected to conduits 255 and 256 to drain fluid into the sump 89, and the valve 250 is provided with a groove 257 adapted to open the conduit 255 when moved into a certain position, and valve 250 closes the conduit 255 when in other positions as is apparent. A spring 258 is provided acting on the upper end of the valve 250, and the valve is connected at its lower end with the accelerator 220 by means of any suitable linkages, such as the links 259 and 260. The arrangement of links connecting the accelerator 220 and the valve 250 is such that when the accelerator is moved to the open throttle limit of its movement, it moves the valve 250 upwardly in the casing portion 254, so that its groove 257 opens the conduit 255, and this movement of the valve 250 is against the action of the spring 258.

The valve 251 is in the form of a sleeve and carries a collar 261 which abuts against the casing 254 and limits the downward movement of the valve, and a spring 262 acts on the collar 261 so as to yieldably hold the valve 251 in its illustrated position. The valve 251 is provided with a groove 263 which, in the illustrated position of the valve, opens the conduit 256. The selector valve 149 is provided with a collar 264 adapted to act on an inwardly extending rim portion 265 of the valve 251, so that the valve 251 may be moved upwardly in the cylinder 253 by corresponding movement of the valve 149.

A valve element 266 carried by a bimetallic arm 267 in the conduit portion 105a is provided for effectively increasing and decreasing the size of the orifice 212. The bimetallic arm is so arranged as to move the valve element 266 toward the orifice 212 on an increase in temperature of the oil and to move the valve element 266 in the opposite direction on a decrease in temperature of the oil.

The arrangement shown in Fig. 14 functions substantially in the same manner as that shown in Fig. 6 when the accelerator 220 is moved to an open throttle position, it moves the valve 250 upwardly against the action of the spring 258 so that the groove 257 opens the conduit 255, and fluid under pressure beneath the valve 151 is drained, so that the valve moves into its downshifted position. The addition of the thermostatically controlled valve element 266 for the orifice 212 compensates for changes in temperature of the oil, so that the same decrease in pressure is secured beneath the valve 151 regardless of changes in temperature.

The valve 251 has its groove 263 aligned with the conduit 256, so that the conduit is maintained open to hold the valve 151 in its downshifted position, for all positions of the selector valve 149 with the exception of its "drive" position. When the selector valve is moved into its "drive" position, it moves the valve 251 upwardly by means of its collar 264 against the action of the spring 262 and closes the conduit 263, so that a release of fluid pressure beneath the automatic valve 151 may be subsequently secured only by a movement of the accelerator 220 into its open throttle kickdown position.

My improved transmission control mechanism advantageously includes the two automatic shift valves 151 and 150 exposed to the fluid pressure generated by the driven shaft pump 86, which varies in accordance with driven shaft speed, and exposed to the pressure in the conduit 104, which varies with the torque output of the engine, for providing the two automatic upshifts, from first to second speed ratios and from second to third speed ratios. The mechanism includes improved arrangements for downshifting the transmission including the relief valve 222 providing a pressure in the discharge conduit 105 for the driven shaft pump 86 having a maximum that varies in accordance with the fluid pressure in the conduit 104 varying with drive shaft speed. The thermostatically controlled valve 266 is considered advantageous in maintaining the downshift actions for the valve 151 uniform regardless of temperature variations. The application of the fluid pressure from the driven shaft pump 86 to the orifice controlling plunger 131 advantageously causes a closure of the orifice 125 after an initial engagement of the starting clutch C–1 has been attained, and the piston 142 and valve 107 for changing the output fluid pressure of the drive shaft pump 56 for a drive in reverse allows the use of a smaller piston 42 for clutch C–2 than the piston 47, so that the same fluid pressure may be utilized for a smooth and gradual engagement of the clutch C–2 for a drive in third speed forward drive as is used to complete the low and intermediate speed forward power trains.

I wish it to be understood that my invention is not to be limited to the specific constructions, arrangements and devices to be hereinafter described and claimed, except only insofar as the claims may be so limited, as it will be understood to those skilled in the art that changes may be made without departing from the principles of the invention.

I claim:

1. In transmission mechanism, the combination of a drive shaft, a driven shaft, means for providing relatively low, intermediate and high ratio drives between said shafts, means for upshifting said mechanism from said low to intermediate drive and including a shift valve having upshifted and downshifted positions, means for upshifting said mechanism from intermediate to high ratio drive and including a second shift valve having upshifted and downshifted positions, and means providing a fluid pressure effective on both said valves tending to upshift them which varies with driven shaft speed, said last-named means including a pump having an inlet and an outlet, means forming a fluid sump with which said pump inlet is connected, said pump outlet being connected with said shift valves for shifting them, and means providing a relief orifice in parallel with said shift valves through which the pump output may discharge for so varying the pressure, and thermostatic means responsive to changes in temperature of the fluid for decreasing the effective size of said orifice on an increase in temperature for causing the changes in pressure on said shift valves to remain substantially the same regardless of temperature variations.

2. In transmission mechanism for an automotive vehicle having a driving engine with a fuel intake manifold the pressure in which varies with engine torque, the combination of a drive shaft, a driven shaft, means for providing relatively low, intermediate and high ratio drives between said shafts, means for upshifting said mechanism from said low to intermediate drive and including a shift valve having upshifted and downshifted positions, means for upshifting said mechanism from intermediate to high ratio drive and including a second shift valve having upshifted and downshifted positions, means providing a fluid pressure effective on both said valves tending to upshift them which varies with driven shaft speed, said last-named means including a pump driven by said driven shaft and means providing a relief orifice through which the pump output may discharge for so varying the fluid pressure, and means providing a fluid pressure on each of said valves tending to shift them toward their downshifted positions which varies with engine torque and including a fluid pressure relief valve actuated by a vacuum motor connected with the fuel intake manifold of the vehicle engine.

3. In transmission mechanism for an automotive vehicle having a driving engine with a fuel intake manifold the pressure in which varies with engine torque, the combination of a drive shaft, a driven shaft, means for providing relatively low, intermediate and high speed ratio drives between said shafts, said means for providing low ratio drive including a fluid pressure responsive friction engaging means for completing the drive, means for upshifting said mechanism from said low to intermediate drive, and including a shift valve having upshifted and downshifted positions, means for upshifting said mechanism from intermediate to high ratio drive and including a second shift valve having upshifted and downshifted positions, means providing a fluid pressure effective on both said valves to upshift them which varies with driven shaft speed and including a pump driven by said driven shaft and means providing a relief orifice through which the pump output may discharge so that the fluid pressure varies with driven shaft speed, means providing a fluid pressure on said valves tending to downshift the valves which varies with engine torque output and including a pump driven by said drive shaft, a pressure relief valve for the output of said latter pump and a vacuum motor effective on said valve and connected with the fuel intake manifold for the engine, and means for providing a fluid pressure for said friction engaging means which varies according to drive shaft speed for starting the vehicle and including means forming an orifice connected with the outlet of said drive shaft pump for relieving the pump pressure so that it varies according to the drive shaft speed.

4. In transmission mechanism, the combination of a drive shaft, a driven shaft, means for providing a power train between said shafts and including a fluid pressure actuated friction engaging means for completing the power train, a fluid pump driven by said drive shaft having an output connectible with said friction engaging means, means for providing a relief orifice connected with said pump output for causing the output pressure to vary according to drive shaft speed and for causing a gradual engagement of the friction engaging means, and means responsive to the speed of said driven shaft for closing said orifice above a predetermined speed of said driven shaft and after said engaging means has been engaged.

5. In transmission mechanism, the combination of a drive shaft, a driven shaft, means for providing a power train between said shafts and including a fluid pressure actuated friction engaging means for completing the power train, a fluid pump driven by said drive shaft and having an output connectible with said friction engaging means, means for providing a relief orifice connected with said pump output for causing the output pressure to vary according to drive shaft speed and for thereby causing gradual engagement of the friction engaging means, a valve movable to close said orifice and a spring for yieldably holding said valve in its orifice opening position, and means for providing a fluid pressure that increases with the speed of said driven shaft and applied to said valve for closing the valve above a predetermined speed of the driven shaft and after said engaging means has been engaged.

6. In transmission mechanism, the combination of a drive shaft, a driven shaft, means for providing a power train between said shafts and including a fluid pressure actuated friction engaging means for completing the power train, a fluid pump driven by said drive shaft and having an output connectible with said friction engaging means, means for providing a relief orifice connected with said pump output for causing the output pressure to vary according to drive shaft speed and for causing gradual engagement of the friction engaging means, a valve adapted to close said orifice, a spring effective on said valve for holding the valve in its orifice opening position, and means for providing a fluid pressure that varies with the speed of said driven shaft and impressed on said valve for closing the orifice above a predetermined speed of said driven shaft, said last-named means including a pump driven by said driven shaft and means providing a relief orifice connected with the output of said driven shaft pump for causing the output of the latter pump to vary according to the speed of said driven shaft.

7. In transmission mechanism, the combination of a drive shaft, a driven shaft, means for providing a power train between said shafts and including a fluid pressure actuated friction engaging means for completing the power train, a fluid pump driven by said drive shaft and having an output connectible with said friction engaging means, means for providing a relief orifice connected with said pump output for causing the output pressure to vary according to drive shaft speed and for causing gradual engagement of the friction engaging means, a valve for closing said orifice, a spring for yieldably holding said valve in orifice opening position, a thermostat responsive to the temperature of said fluid and effective on said valve for moving the valve to decrease the effective size of said orifice on an increase in fluid temperature, and means providing a fluid pressure that varies with the speed of said driven shaft and including a pump driven by the driven shaft and means providing a relief orifice connected with the output of said driven shaft pump for causing the output pressure to vary according to driven shaft speed, said driven shaft pump output being connected with said valve for moving said valve into orifice closing position against the action of said spring above a predetermined speed of said driven shaft and after said engaging means has been engaged.

8. In transmission mechanism, the combination of a drive shaft, a driven shaft, means for providing relatively low and high ratio drives between said shafts, fluid pressure responsive means for upshifting said mechanism from said low to high speed ratio drives and including a shift valve having upshifted and downshifted positions, means providing a fluid pressure that varies with the speed of said driven shaft and including a pump driven by said driven shaft and means providing a relief orifice for the output of the pump, said pump output also being impressed on said shift valve tending to shift the valve to its upshifted position, a thermostatically controlled valve for said orifice for causing the increase in fluid pressure from said driven shaft pump to be substantially the same regardless of changes in fluid temperature, a relief valve for relieving and decreasing the fluid pressure on said shift valve and selectively operable for selectively causing a downshifting movement of the shift valve, and thermostatic valve means effectively in series with said relief valve for causing the decrease in fluid pressure by said relief valve to be substantially the same regardless of changes in fluid temperature.

9. In transmission mechanism, the combination of a drive shaft, a driven shaft, means for providing relatively low, intermediate and high ratio drives between said shafts, means for upshifting the mechanism from said low to intermediate drive and including a shift valve having upshifted and downshifted positions, means for upshifting the mechanism from intermediate to high ratio drive and including a second shift valve having upshifted and downshifted positions, a pump driven by said driven shaft, means forming a relief orifice connected with the output of said pump whereby the output of the pump varies in accordance with driven shaft speed, said pump output being applied to said two shift valves tending to move the valves into their upshifted positions with an increase in driven shaft speed and pump output, means forming a restricted orifice between said intermediate to high valve and the output of said driven shaft pump, and a control valve for selectively relieving the fluid pressure from the driven shaft pump on said intermediate to high valve and causing the valve to move from its upshifted position to its downshifted position when the control valve is opened, said restricted orifice causing a differential of fluid pressure from said driven shaft pump to be exerted on said two shift valves whereby when the control valve is opened, the intermediate to high shift valve is downshifted without causing a corresponding downshifting movement of said low to intermediate shift valve.

10. In transmission mechanism for an automotive vehicle, the combination of a drive shaft, a driven shaft, means for providing relatively low and high ratio drives between said shafts, means for upshifting said mechanism from said low to high drive and including a shift valve having downshifted and upshifted positions for causing a change in speed ratio between said drives when the valve is moved, a pump driven by said driven shaft, means forming an orifice for relieving the output of said pump whereby the output varies with the speed of the driven shaft, said pump output being applied to said shift valve tending to move the shift valve into its upshifted position with an increase of pump output pressure and driven shaft speed, a control valve for relieving the fluid pressure applied to said shift valve for causing a movement of said shift valve from its upshifted position to its downshifted position when the control valve is opened, a walking beam both ends of which may be moved in order to open said control valve, an accelerator for the vehicle, linkage connecting one end of said walking beam and said accelerator whereby said control valve is opened when the accelerator is moved to an open throttle kickdown position, and a selector member effective on the other end of said walking beam so that the control valve is opened when the selector member is given a certain movement for causing a downshifting movement of said shift valve.

11. In transmission mechanism for an automotive vehicle having a driving engine, the combination of a drive shaft, a driven shaft, means providing relatively low and high ratio drives between said shafts, means for upshifting the mechanism from said low to high ratio drive and including a shift member having upshifted and downshifted positions which functions to shift the mechanism between its drives on being moved between its said positions, means providing a fluid pressure that varies in accordance with the speed of said driven shaft and applied to said shift member tending to move the shift member into its upshifted position on an increase in speed of said driven shaft, means providing a fluid pressure that varies with engine torque and applied to said shift member tending to shift the shift member from its upshifted position to its downshifted position, a valve for selectively relieving the driven shaft variable pressure on said shift member, and means providing a variable limit to the pressure that varies with driven shaft speed and under the control of the engine torque variable pressure so that the limit of the driven shaft fluid pressure decreases with a decrease in engine torque variable fluid pressure whereby the engine torque variable fluid pressure is not effective to move the shift member into its upshifted position when said last-named valve is opened and said driven shaft speed increases with a decrease in engine torque variable fluid pressure.

12. In transmission mechanism for an automotive vehicle having a driving engine, the combination of a drive shaft, a driven shaft, means for providing relatively low and high ratio drives between said shafts, means for upshifting the mechanism from said low to high ratio drive and including a shift valve having upshifted and downshifted positions and effective to change the ratio of the transmission mechanism between its ratios when the valve is moved, means providing a fluid pressure that varies in accordance with the speed of said driven shaft and impressed on said shift valve tending to move the shift valve from its downshifted to its upshifted position, means providing a fluid pressure that varies in accordance with the output torque of said vehicle engine and applied to said shift valve tending to move the shift valve from its upshifted position to its downshifted position, a control valve for selectively relieving the driven shaft fluid pressure applied to said shift valve so as to tend to maintain the shift valve in its downshifted position, and a relief valve having opposite faces of different area in communication with the engine torque variable pressure and the driven shaft variable pressure and which is effective to relieve and provide a variable limit to the driven shaft variable fluid pressure which is less for a smaller engine torque and engine torque variable fluid pressure for preventing an unwanted upshifting movement of said shift valve due to an increase in driven shaft speed variable pressure with a low engine torque variable fluid pressure.

13. In transmission mechanism for an automotive vehicle with a driving engine having a fuel intake manifold the pressure in which varies with engine torque output, the combination of a drive shaft, a driven shaft, means for providing relatively low and high ratio drives between said shafts, means for upshifting said mechanism from said low to high ratio drive and including a shift valve having upshifted and downshifted positions which functions to change the speed ratio of the transmission mechanism when the valve is moved between its two positions, a pump driven by said driven shaft, means providing a relief orifice connected with the output of said pump whereby the pump output pressure varies in accordance with the speed of said driven shaft, said pump output being applied to said shift valve tending to move the valve from its downshifted position to its upshifted position, a pump driven by said drive shaft, means providing a relief valve for the output of said drive shaft pump which regulates the pump pressure in accordance with the output torque of said vehicle engine and having a pressure responsive motor effective on the valve and connected with the intake manifold of the vehicle engine, said drive shaft pump output being impressed on said shift valve tending to move the valve from its upshifted position to its downshifted position, a relief valve for said driven shaft pump and effective to allow a discharge from the driven shaft pump into the output of said drive shaft pump when the relief valve is open, a selectively operated downshifting valve for relieving the fluid pressure from said driven shaft pump applied to said shift valve for selectively causing a movement of the shift valve from its upshifted position to its downshifted position, said relief valve having a relatively large area applied to said driven shaft pump pressure and a relatively small opposing area applied to said drive shaft pump pressure whereby the pressure relief valve regulates the limit of the driven shaft pump pressure in accordance with variations in drive shaft pump pressure so that the limit of the driven shaft pump pressure is less with a decreased drive shaft pump pressure whereby when said downshifting valve is open, the driven shaft pump does not develop sufficient pressure to cause an upshifting movement of the shift valve with a decrease in drive shaft pump pressure with a decreased engine torque.

14. In transmission mechanism, the combination of a drive shaft, a driven shaft, means for providing two different drives between said shafts and including a fluid pressure engaged friction engaging means for completing each of the drives, a pump driven by said drive shaft, means providing a relief orifice connected with the output of said pump for providing a fluid pressure that increases in accordance with drive shaft speed, means for connecting said pump output with either of said friction engaging means, and means for modifying the action of said orifice to provide a fluid pressure that increases faster in relation to drive shaft speed for one of said friction engaging means than for the other and including a valve element for effectively reducing the size of said orifice and connected with one of said friction engaging means so that the fluid pressure applied thereto moves the valve element.

15. In transmission mechanism, the combination of a drive shaft, a driven shaft, means for providing two different drives between said shafts and including a fluid pressure actuated friction engaging means for completing each of the drives, a pump driven by said drive shaft, means providing a relief orifice through which the output from the pump may discharge whereby the fluid pressure output of the pump increases in accordance with drive shaft speed, means for connecting said pump output with either of said two friction engaging means, a movable valve element for decreasing the effective size of said orifice, a thermostatic element connected with said valve element and responsive to the temperature of the fluid from said pump for moving the valve element to decrease the effective size of the orifice with an increase in fluid temperature, a piston connected with said thermostatic element and effective through the thermostatic element to move the valve element to reduce the effective size of said orifice when fluid pressure is applied to the piston, and means for hydraulically connecting said piston with one of said friction engaging means whereby the piston is effective to reduce the effective size of the orifice and thereby provide a fluid pressure that increases more greatly with drive shaft speed for engaging the last-named friction engaging means.

16. In transmission mechanism for an automotive vehicle having a driving engine, the combination of a drive shaft, a driven shaft, means for providing two different drives between said shafts and including two fluid pressure engaged friction engaging means for respectively completing the drives, a pump driven by said drive shaft, means forming an orifice connected with the output of said pump to thereby provide a pump output pressure that increases with drive shaft speed, a relief valve means responsive to variations in the output torque of the vehicle engine for providing a regulated limit of fluid pressure from the pump which varies according to the output torque of the vehicle engine, means for connecting either of said friction engaging means with said pump for causing an engagement thereof with the drive shaft speed varying fluid pressure and for subsequently maintaining engagement thereof with the engine torque variable fluid pressure, limit valve means for reducing the effective size of said orifice, and means effective on both said valve means for reducing the effective size of said orifice and for loading said relief valve means differently for an engagement of one of said friction engaging means than for an engagement of the other to provide a greater rate of increase of fluid pressure for drive shaft speed and for providing a greater limit of pump output pressure for one of the engaging means as compared with the other.

17. In transmission mechanism for an automotive vehicle having a driving engine, the combination of a drive shaft, a driven shaft, means for providing two different drives between said shafts and including two fluid pressure actuated friction engaging means for completing the two drives respectively, a pump driven by said drive shaft, means providing an orifice connected with the output of said pump whereby the pump output pressure varies in accordance with the speed of said drive shaft, valve means for varying the effective size of said orifice, a regulating valve for regulating the limit of output pump pressure, means responsive to the torque of the vehicle engine for acting on said regulating valve so that the limit of pump pressure varies according to the engine torque, means for connecting either of said friction engaging means with said pump whereby the engaging means is initially engaged according to the fluid pressure varying with drive shaft speed and is maintained in engagement by the engine torque variable fluid pressure, and piston means hydraulically connected with said friction engaging means and effective on the orifice valve and on the regulating valve for decreasing the effective size of said orifice for one of the engaging means and for causing a loading of the regulating valve for the same friction engaging means whereby the orifice causes a fluid pressure from the pump to increase at a faster rate as compared with the drive shaft speed and the regulating valve subsequently maintains the pressure from the pump at a higher limit for the same friction engaging means.

18. In transmission mechanism for an automotive vehicle having a driving engine with a fuel intake manifold the pressure in which varies with the engine torque output, the combination of a drive shaft, a driven shaft, means for providing two different drives between said shafts and including two fluid pressure actuated friction engaging means for completing the two drives respectively, a pump driven by said drive shaft and adapted to be connected with both of said friction engaging means for causing engagement thereof, means providing an orifice connected with the output of said pump whereby the pump output pressure increases in accordance with drive shaft speed, a regulating valve for the pump output pressure for providing a pump output pressure limit, a pressure motor connected with the intake manifold of the vehicle engine and effective on the regulating valve whereby the fluid pressure limit as regulated by the valve varies in accordance with the output torque of the vehicle engine, a valve for reducing the effective size of said orifice, a piston connected with said last-named valve so as to move the valve to reduce the effective size of said orifice when pressure is applied to the piston, means connecting said piston and one of said friction engaging means whereby the pressure applied to the friction engaging means is applied also to the piston for reducing the effective size of the orifice and for causing a greater rate of increase of fluid pressure from the pump to be applied to the friction engaging means, said regulating valve having a pressure control area, and means connecting said area with said other friction engaging means whereby the fluid pressure applied to the friction engaging means is applied also to the regulating valve for loading the valve to provide a lower limit of output pressure from the pump for the particular friction engaging means.

19. In transmission mechanism, the combination of a drive shaft, a driven shaft, means for providing two different drives between said shafts and including first and second friction engaging means, said first friction engaging means completing one of said drives when it is engaged exclusively of said second engaging means and said engaging means when both are engaged completing the other drive and each carrying only a portion of the torque carried by the first friction means when engaged alone as aforesaid, fluid pressure actuable pistons for engaging each of said engaging means, and a source of fluid pressure connectible with either the piston for said first friction engaging means alone or with the piston for both of said friction engaging means, the piston for said second friction engaging means being smaller in area than the other piston whereby smooth completions of the two power trains from the same pressure source are obtained by engagement of said first friction engaging means alone and by engagement of said second friction engaging means after previous engagement of the first friction engaging means.

20. In transmission mechanism, the combination of a drive shaft, a driven shaft, means for providing two different drives between said shafts and including a planetary gear set and a pair of friction clutches for connecting two different elements of the gear set with said drive shaft, one of said drives being completed by said first clutch when engaged and the other drive being completed when both clutches are engaged, a source of fluid pressure, and a fluid pressure actuable piston for each of said clutches adapted to be connected with said pressure source for engaging the respective clutch, the area of said piston for said first clutch being larger than the area for the piston of said second clutch whereby the same fluid pressure from said source may be utilized for smoothly engaging said first clutch which carries full engine torque for completing the respective drive as for the second clutch for completing the other drive after the first clutch has been previously engaged and which carries only the part of engine torque.

21. In transmission mechanism, the combination of a drive shaft, a driven shaft, means for providing three different power trains between said shafts and including a planetary gear set and first and second friction clutches for connecting two elements of the planetary gear set respectively with said drive shaft, a first one of said drives being completed when said first clutch is engaged exclusive of the other clutch, a second of said drives being completed when said second friction clutch is engaged exclusive of said first clutch, and the third of said drives being completed when both said friction clutches are engaged, a fluid pressure responsive piston for each of said clutches adapted for engaging the clutch when fluid pressure is applied thereto, a source of fluid pressure, selectively operable means for connecting said pistons separately or together with said fluid pressure source, the piston for said second clutch being smaller in fluid pressure responsive area than the other piston whereby the same fluid pressure from said pressure source may be utilized for engaging said first clutch to complete said first power train as is utilized for engaging said second friction clutch for said third power train after said first friction clutch has been previously engaged, and means for increasing the fluid pressure from said pressure source a predetermined amount when the fluid pressure is applied to the piston for said second clutch to complete said second power train.

22. In transmission mechanism for an automotive vehicle having a driving engine, the combination of a drive shaft, a driven shaft, means for providing three different drives between said shafts and including a planetary gear set and first and second friction clutches for connecting two different elements of the gear set with said drive shaft, said first friction clutch when engaged exclusive of the second clutch completing a first one of said drives, said second friction clutch when engaged exclusive of the first friction clutch completing a second one of said drives and said two clutches when both are engaged completing the third of said drives and in this case each clutch carrying only a portion of the drive shaft torque, a pump driven by said drive shaft and providing a fluid pressure source, a fluid pressure responsive piston for engaging each of said clutches and being adapted to be connected with said pump either separately or with the other piston, the piston for said first friction clutch being larger in fluid responsive area than the other piston whereby the same fluid pressure may be utilized for providing a smooth engagement of the first friction clutch to complete said first drive as is utilized for the second friction clutch which may be engaged after said first friction clutch has been previously engaged to provide said third drive, means providing a relief orifice connected with the output of said pump whereby the pump pressure initially increases according to drive shaft speed for providing a gradual engagement of either of said clutches, a regulator valve connected with the output of said pump for limiting the output pressure of the pump, means responsive to the torque of said vehicle engine and adapted to actuate said regulator valve whereby the limit of fluid pressure output by the pump varies in accordance with engine output torque, a valve for changing the effective size of said orifice and piston means operative on the valve, said regulator valve having a piston area effective for biasing the regulator valve, and means connecting said piston for said orifice valve with said piston for said second friction clutch and connecting the piston area for said regulator valve with the piston for said first friction clutch whereby the effective area of the orifice is decreased when the second friction clutch is engaged for providing a greater rate of increase of pump output pressure and said regulator valve is biased when the first friction clutch is engaged to provide a lower limit of fluid output pressure by said pump whereby greater fluid pressures are available for application of said second friction clutch exclusive of the first friction clutch for completing said second drive.

23. In transmission mechanism, the combination of a drive shaft, a driven shaft, means for providing relatively low, intermediate and high ratio drives between said shafts, means for upshifting said mechanism from said low to intermediate drive and including a shift valve having upshifted and downshifted positions, a spring acting against said valve tending to hold it in its downshifted position, means for upshifting said mechanism from intermediate to high ratio drive and including a second separately movable shift valve having upshifted and downshifted positions, a second spring acting against said second valve tending to hold it in its downshifted position, and means providing a fluid pressure that increases coordinately with coordinate increases in speed of said driven shaft and effective on both said valves and moving each of them in an upshifting direction when the fluid pressure increases sufficiently to overcome said springs respectively effective on said valves, said last-named means comprising a pump driven by said driven shaft and means providing a relief orifice through which the pump output is released for so varying the fluid pressure output of the pump.

24. In transmission mechanism for an automotive vehicle having a driving engine with a fuel intake manifold the vacuum in which varies in accordance with the throttle opening torque output of the vehicle engine, the combination of a drive shaft, a driven shaft, means for providing a power train between said shafts and including a fluid pressure engaged friction engaging device for completing the train, a pump connectible with said friction engaging device for providing fluid pressure to engage the friction device, a regulator valve for regulating the pressure output of said pump and having a pressure face with the output pressure of the pump applied thereto, means providing a fluid relief passage connected with the output of said pump and adapted to be opened by movement of the regulator valve on the pressure becoming excessive, a spring effective on said regulator valve tending to move the valve into passage closing position, and a vacuum motor connected with said engine manifold and having a reciprocable output member effective on said valve to augment the action of said spring, said reciprocable output member being normally in contact with the valve and being adapted to move away out of contact with the valve when the fuel intake vacuum increases above a predetermined value whereby said spring is effective to provide at least a minimum fluid pressure limit of the fluid from said pump sufficient to maintain said friction engaging device engaged when the engine throttle is substantially closed.

25. In transmission mechanism for an automotive vehicle having a driving engine, the combination of a drive shaft, a driven shaft, means for providing a power train between said shafts and including a fluid pressure engaged friction engaging device for completing the train, a pump connectible with said friction engaging device for providing fluid pressure to engage the friction device, a regulator valve for regulating the pressure output of said pump and having a pressure face with the output pressure of the pump applied thereto, means providing a fluid relief passage connected with the output of said pump and adapted to be opened by movement of the regulator valve on the pressure becoming excessive, a spring effective on said regulator valve tending to move the valve into passage closing position, a reciprocable member indicative of the torque demand of the vehicle engine and effective on said valve to augment the action of said spring on increased torque demand of the vehicle engine, said reciprocable member being normally in contact with the valve and being adapted to move away out of contact with the valve when the torque demand is substantially at a minimum whereby said spring is effective to provide at least a minimum pressure limit of the fluid from said pump sufficient to maintain said friction engaging device engaged when the torque demand is at a substantial minimum.

References Cited in the file of this patent

UNITED STATES PATENTS

| | | |
|---|---|---|
| 1,905,284 | Heitger | Apr. 25, 1933 |
| 2,372,817 | Dodge | Apr. 3, 1945 |
| 2,576,336 | Farkas | Nov. 27, 1951 |

OTHER REFERENCES

Hydraulics, 2nd ed., R. L. Daugherty, 1919.